United States Patent [19]

Freidin

[11] Patent Number: 4,967,346
[45] Date of Patent: Oct. 30, 1990

[54] UNIVERSAL MICROPROCESSOR INTERFACE CIRCUIT

[75] Inventor: Philip Freidin, Sunnyvale, Calif.

[73] Assignee: Advanced Micro Devices, Inc., Sunnyvale, Calif.

[21] Appl. No.: 167,598

[22] Filed: Mar. 14, 1988

[51] Int. Cl.[5] .............................................. G06F 3/00
[52] U.S. Cl. .................................. 364/200; 364/232.8; 364/239; 364/239.9
[58] Field of Search ... 364/200 MS File, 900 MS File

[56] References Cited

U.S. PATENT DOCUMENTS 4,287,563  9/1981  Huston, Jr. ......................... 364/200
4,379,327  4/1983  Tietjen et al. ...................... 364/200
4,641,261  2/1987  Dwyer et al. ....................... 364/900

Primary Examiner—Raulfe B. Zache
Attorney, Agent, or Firm—Mikio Ishimaru; Terrence E. Dooher; Stephen C. Durant

[57] ABSTRACT

Interface circuitry (24) is provided which automatically detects which of two types of microprocessor is connected to the interface and configures the interface accordingly. A "type" flip-flop (36, 38) is initially set to expect a first type of microprocessor (10) and the interface is configured to expect a read and a write strobe. When a write cycle is performed by a second type (14) of microprocessor, the "type" flip-flop changes state and reconfigures the interface to expect a data strobe and a read/write indicator signal.

10 Claims, 2 Drawing Sheets

4,967,346

UNIVERSAL MICROPROCESSOR INTERFACE CIRCUIT

CROSS-REFERENCE TO RELATED, COPENDING APPLICATION

A related, copending application of particular interest to the instant application is U.S. Ser. No. 167,592, filed Mar. 14, 1988, on behalf of Bernard J. New and Phillip Freidin, entitled Bus Compatible Programmable Sequence and assigned to the assignee of the instant application.

FIELD OF THE INVENTION

This invention relates to digital interface circuitry, and more particularly, to an interface circuit which automatically detects the type of external microprocessor present at the inteface and configures the interface to adapt to either of two type of microprocessors.

BACKGROUND OF THE INVENTION

Connection of a microprocessor to a peripheral circuit is a common requirement. Because mircroprocessors utilize various read and write timing signals at the interface to the peripheral circuit, customized interface circuitry has been required. A typical arrangement are microprocessors manufactured by the Intel Corporation which use a read strobe and a wirte strobe, while those manufactured by the Motorola Corporation use a data strobe and a read/write indicator.

Peripheral devices are therefore directly compatible with one of the two standards. Additional ciruitry is needed to connect to a microprocessor employing the other standard. One solution to this restriction of devices is a Motorola "Motel" interface used on the Motorola MC146818 part. The "Motel" interface allows either microprocessor type to be connected to the part. However, this interface requires a 3-wire interconnection, including a separate timing signal.

Thus the prior art has employed discrete and/or custom integrated circuitry which lacks the flexibility to meet changing needs, because the timing signal is not always available.

SUMMARY OF THE INVENTION

Interface circuitry is provided by the instant invention which allows either Intel-type or Motorola-type microprocessors to be connected via two wires. No separate timing signal is needed by the interface circuitry. The circuitry automatically detects which type of microprocessor is connected and reconfigures the interface to accommodate the microprocessor.

A type flip-flop is initially set to a first type of microprocessor and the interface is appropriately configured to expect a read and a write strobe. When a write cycle is performed by a second type of microprocessor, the "type" flip-flop switches and reconfigures the interface to expect a data strobe and a read/write indicator signal.

DETAILED DESCRIPTION OF A PREFERRED EMBODIMENT

Figure 1A:
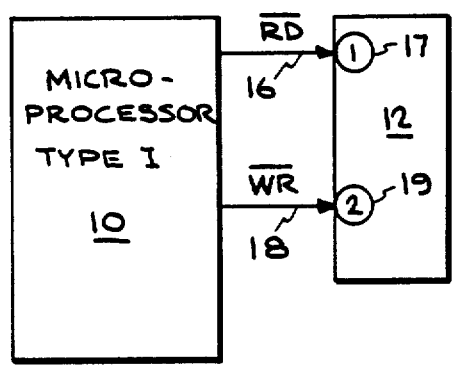
FIGS. 1(a) and 1(b) illustrate connection of either a Type-I or a Type-II microprocessor to a circuit via the universal interface circuitry of the present invention.
Figure 1B:
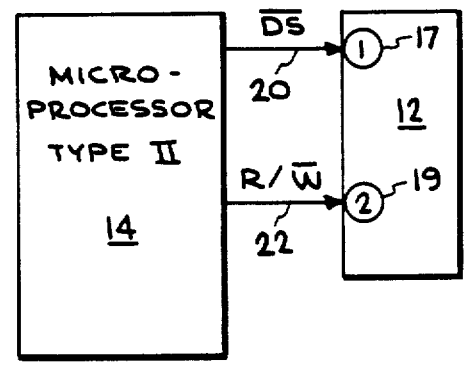

FIG. 1(a) illustrates interconnection of a Type-I microprocessor 10 to a device 12 employing the universal interface of the present invention. FIG. 1(b) illustrates interconnection of a Type II micrprocessor 14 to the device 12. As shown in FIG. 1(a), Type I microprocessor 10 employes a read ($\overline{RD}$) signal conducted on a signal line 16 to a first terminal 17 of device 12 and a write ($\overline{WR}$) signal conducted on a signal line 18 to a second terminal 19 of device 12. A separate data bus (not shown) is employed to conduct data signals between microprocessor 10 and device 12, as will be appreciated by those skilled in the art.

Thus the interconnection shown in FIG. 1(a) allows data to be transferred on the data bus from microprocessor 10 to the device 12 upon assertion of a $\overline{WR}$ signal on line 18 and from device 12 to microprocessor 10 upon assertion of a $\overline{RD}$ signal on line 16.

In the case of the interconnection shown in FIG. 1(b) Type-II microprocessor 14 employs a data-strobe ($\overline{DS}$) signal conducted on a signal line 20 to the first terminal 17 of device 12 and a read/write ($R\overline{W}$) signal conducted on a signal line 22 to the second terminal 19 of device 12. As in the situation illustrated in FIG. 1(a), a separate data bus (not shown) conducts data signals between microprocessor 14 and device 12. Upon assertion of the $\overline{DS}$ signal data will be transferred between microprocessor 14 and device 12; the direction is established by the level of the R/$\overline{W}$ signal: at a first level transfer will be from microprocessor 14 to device 12, at a second level transfer will be from device 12 to micrprocessor 14.

Figure 2:
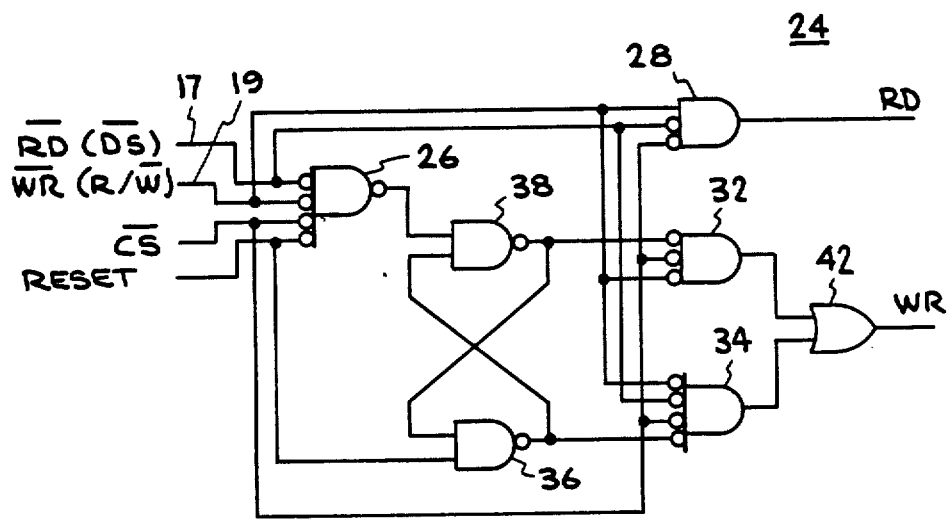
FIG. 2 is a logic diagram of a universal interface circuit according to the instant invention.

With reference now to FIG. 2, a logic diagram of an interface circuit 24 according to the instant invention will now be described. A first NAND gate 26 receives at a first complemented input terminal the signal applied to terminal 17 of device 12. This signal will be the $\overline{RD}$ signal or the $\overline{DS}$ signal according to whether a Type-I or a Type-II microprocessor is employed, respectively. The signal applied to terminal 17 is also conducted to a first complemented input terminal of an AND gate 28 and AND gate 34. The signal applied to terminal 19 of device 12 is similarly conducted to a second complemented input of NAND gate 26 and a true input of AND gate 28, and to a first complemented input of AND gate 32 and a second complemented input of AND gate 34. This signal will be the $\overline{WR}$ signal or the R/$\overline{W}$ signal depending on whether a Type-I or a Type-II microprocessor is employed, respectively.

A chip select ($\overline{CS}$) signal generated by the microprocessor is conducted to a third complemented input of NAND gate 26, to a second complemented input of AND gate 28, to a second complemented input of AND gate 32, and to a third complemented input of AND gate 34. A RESET signal also generated by the microprocessor is conducted to a first true input of NAND gate 26 and a first true input of a NAND gate 36.

The signal generated by NAND gate is conducted to a first true input of a NAND gate 38. The signal generated by NAND gate 36 is conducted to a second true input of NAND gate 38 and the signal generated by NAND gate 38 is conducted to a second true input of NAND gate 36.

The signal generated by NAND gate 36 is also conducted to fourth complemented input of AND gate 34. And the signal generated by NAND gate 38 is conducted to a third complemented input of AND gate 32.

The signals genrated by AND gate 28 is the read (RD) signal to be used internally by device 12 to transfer data to the microprocessor on the data bus. The signals generated by AND gates 32 and 34 are applied to the input terminals of an OR gate 42. OR gate 42 generates therefrom a write (WR) signal to be used internally by device 12 to transfer data from the microprocessor on the data bus.

Figure 3A:
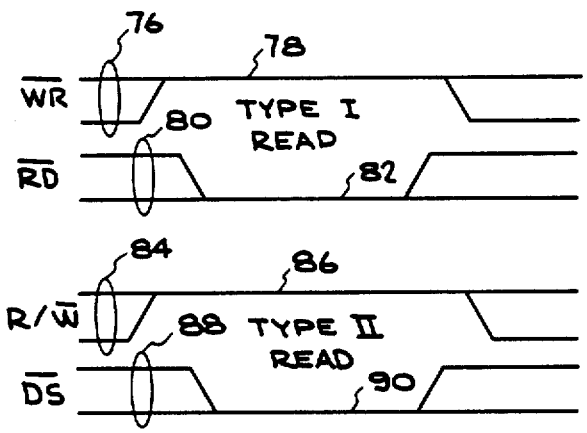
FIGS. 3(a) and 3(b) are timing diagrams illustrating the operation of the universal interface circuit of FIG. 2.
Figure 3B:
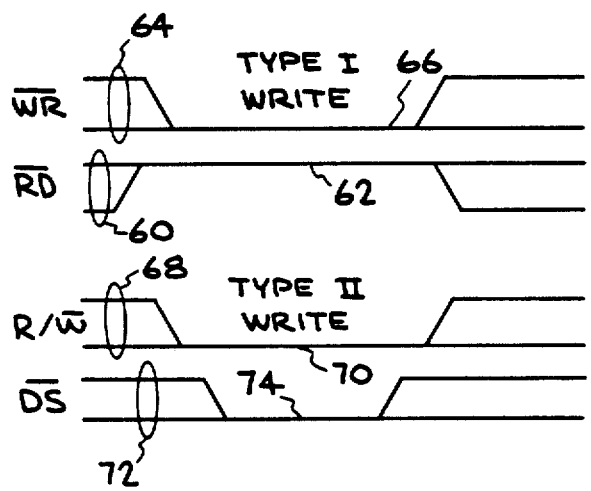

With reference to the timing diagram of FIG. 3, the operation of interface circuit 24 of the instant invention will be described. FIG. 3 is a unitary figure illustrating a read operation by either a Type-I or a Type-II microprocessor in FIG. 3(a) and illustrating a write operation by either a Type-I or a Type-II microprocessor in FIG. 3(b). A RESET signal is initially applied to circuit 24 which causes NAND gate 36 to generate a HIGH signal and accordingly causes NANd gate 38 to generate a low signal. The cross-coupled NAND gate 36 will accordingly continue to generate a HIGH signal. NAND gates 36 and 38 comprise a flip-flop which monitors the type of microprocessor connected to device 12. Accordingly, the type flip-flop is initially set to "Type-I" upon reset.

A Type-I microprocessor employs the write sequence illustrated in the upper portion of FIG. 3(b). The $\overline{RD}$ signal 60 applied to terminal 17 is brought HIGH 62. Thereafter the $\overline{WR}$ signal 64 applied to terminal 19 is brought LOW 66. If, in fact, a Type-I microprocessor is connected at terminals 17 and 19 the type flip-flop will remain in its type-I setting because reception of a HIGH $\overline{RD}$ signal by NAND gate 26 will maintain its output at HIGH even upon later reception of a LOW $\overline{WR}$ signal. Since the $\overline{RD}$ signal is maintained HIGH throughout application of the LOW $\overline{WR}$ signal, the type flip-flop does not change state.

However, if a Type-II microprocessor is connected to device 12 at terminals 17 and 19, it will employ the write sequence illustrated in the lower portion of FIG. 3(b). The R/$\overline{W}$ signal 68 applied to terminal 17 will be brought LOW 70 before the $\overline{DS}$ signal 72 is brought LOW 74. Accordingly, NAND gate 26 will generate a LOW output causing type flip-flop to change to TYPE-II state, as one of the input signals applied to NAND gate 38 is now LOW. The type flip flop will not revert to Type-I state until reset occurs.

Once the type flip-flop has been properly set, the signals RD and WR generated by AND gate 28 and OR gate 42, respectively, will be generated as follows: A Type-I read operation is shown in the upper portion of FIG. 3(a). The $\overline{WR}$ signal 76 is initially brought HIGH 78. Since type flip-flop has been set to its Type-I state, AND gate 34 is disabled. Accordingly, the $\overline{WR}$ signal is conducted to the true input of AND gate 28, and the complemented input of gate 32. Upon bringing $\overline{RD}$ signal 80 to a low 82 its reception at a complemented input of gate 28 causes it to generate a HIGH which is a HIGH RD signal. Since the HIGH $\overline{WR}$ signal is applied to a complemented input of AND gate 32, AND gate 32 remains generating a LOW. Accordingly, both signals received by OR gate 42 remain LOW and no WR signal is generated.

However, in the case where type flip-flop has been set to its type-II state, ANd gate 34 is enabled and AND gate 32 is disabled. Accordingly, the Type-II read illustrated in the lower portion of FIG. 3(a) will be performed as follows. The R/$\overline{W}$ signal 84 is initially brought HIGH 86. This signal is conducted to a true input of AND gate 28 and a complemented input of ANd gate 34. Accordingly, gate 34 is disabled. The $\overline{DS}$ signal 88 is subsequently brought LOW 90. This LOW is applied to a complemented input of AND gate 28 which accordingly generates a HIGH signal which is a HIGH RD signal.

In a manner similar to that described for a Type-I read operation, both input signals to OR gate 42 are kept LOW throughout the read pictured in FIG. 3(a) accordingly the WR signal generated by OR gate 42 is maintained LOW.

A Type-I and Type-II write, illustrated in FIG. 3(b) is accomplished analogously to that for the read operations described above and, accordingly, will not be further described. In either a Type-I or Type-II operation, the WR signal generated by OR gate 42 will become HIGH, while the RD signal generated by AND gate 28 will be mainteained LOW.

What is claimed is:

1. An apparatus for alternatively connecting to at least one first type of microprocessor that generates first and second timing signals of a first type or to at least one second type of microprocessor that generates first and second timing signals of a second type and for producing WRITE data signals and READ data signals in response to either the first type or the second type first and second timing signals, whereing the first and second timing signals of the first type determine whether a read operation or a write operation is to occur for the at least one first type fo microprocessor and the first and second timing signals of the second type determine whether a read operation of a write operation is to occur for the at least one second microprocessor, the apparatus comprising:

first means, responsive to the first and second timing signals of the first type, for producing the WRITE data signals and the READ data signals;

second means, responsive to the first and second timing signals of the second type, for producing the write data signals and the READ data signals;

indicating means, responsive to the first and the second timing signals of the first type or to the first and the second timing signals of the second type, for indicating whether the first and second timing signals are of the first type or of the second type; and activating means, responsive to said indicating means, for activating either said first means or said second means.

2. The apparatus of claim 1 wherein said first means and said second means share at least one logic gate in common.

3. The apparatus of claim 1 wherein said means for activating activates said first means in response to an indication that the first and second timing signals are of the first type and activates said second means in response to an indication that the first and second timing signals are of the second type.

4. The apparatus of claim 1 wherein said means for activating includes storage means for storing signals that can activate either said first means or said second means.

5. The apparatus of claim 1, wherein said means for activating includes at least one flip-flop that can switch between a first state and a second state in response to said means for indicating.

6. The apparatus of claim 1, wherein:
said means for indicating provides an indication signal that indicates whether the first and second timing signals are of the first type or of the second type; and
said means for activating includes at least one flip-flop that can switch between a first state and a second state in response to the indication signal.

7. The apparatus of claim 1, wherein said second timing signal of the first type and said second timing signal of the second type share one gate to generate said READ data signals.

8. An apparatus for alternatively connecting to at least one first type of microprocessor that generates first and second timing signals of a first type or to at least one second type of microprocesor that generates first and second timing signals of a second type and for producing WRITE data signals and READ data signals in response to either the first type or the second type of first and second timing signals, wherein the first and second timing signals of the first type determine whether a read operation or a write operation is to occur for the at least one first type of microprocessor and the first and second timing signals of the second type determine whether a read operation or a write operation is to occur for the at least one second microprocessor, the apparatus comprising:
first means, responsive to the first and second timing signals of the first type, for producing the WRITE data signals and the READ data signals;
second means, responsive to the first and second timing signals of the second type, for producing the WRITE data signals and the READ data signals;
indicating means, responsive to the first and the second timing signals of the first type or to the first and the second timing signals of the second type, for indicating whether the first and second timing signals are of the first type or of the second type; and
activating means including at least one flip-flop that can switch between a first state and a second state in response to said indicating means;
wherein said first means produces the WRITE data signals and the READ data signals when said at least one flip-flop is in the first state; and
wherein said second means produces the WRITE data signals and the READ data signals when said at least one flip-flop is in the second state.

9. A method for producing WRITE data signals and READ data signals in response to either first and second timing signals of a first type generated by a first type of microprocessor or in response to first and second timing signals of a second type generated by a second type of microprocessor, wherein the first and second timing signals of the first type determine whether a read operation or a write operation is to occur for the at least one first type of microprocessor and the first and second timing signals of the second type determined whether a read operation or a write operation is to occur for the at least one second mircoprocessor, the method comprising the steps of:
providing at least one logic signal in a first logical state;
generating an indicating signal in response to first and second timing signals of the first type or first and second timing signals of the second type;
performing either a step of maintaining the state of the at least one logical signal in the first logical state in response to the receipt of first and second timing signals of the first type or a step of changing the state of the at least one logic signal to a second logical state in response to the receipt of first and second timing signals of the second type, according to the indicating signal;
alternatively receiving first and second timing signals of the first type or first and second timing signals of the second type;
producing the WRITE data signals and the READ data signals from the received signals using first means for producing when the at least one logic signal is in the first logical state; and
producing the WRITE data signal and the READ data signals from received signals using second means for producing when the at least one logic signal is in the second logical state.

10. A method for producing WRITE data signals and READ data signals in response to either first and second timing signals of a first type generated by a first type of microprocessor or in response to first and second timing signals of a second type generated by a second type of microprocessor, wherein the first and second timing signals of the first type determine whether a read operation or a write operation is to occur for the at least one first type of microprocessor and the first and second timing signals of the second type determine whether a read operation or a write operation is to occur for the at least one second mircoprocessor, the method comprising the steps of:
providing a flip-flop in a first logical state;
generating an indicating signal in response to first and second timing signals of the first type or first and second timing signals to the second type;
performing either a step of maintaining the state of the flip-flop in the first logical state in response to the receipt of first and second timing signals of the first type or a step of changing the state of the flip-flop to a second logical state in response to the receipt of initial first and second timing signals of the second type, according to the indicating signal;
alternatively receiving first and second timing signals of the first type or first and second timing signals of the second type;
producing the WRITE data signals and the READ data signals from the received signals using first means for producing when the flip-flop is in the first logical state; and
producing the WRITE date signals and the READ data signals from the received signals using second means for producing when the flip-flop is in the second logical state.

* * * * *